Aug. 18, 1931.  S. MATSUMOTO  1,819,185

LINK BELT

Filed Aug. 15, 1928  3 Sheets-Sheet 1

INVENTOR
SHIGERU MATSUMOTO
BY
Richards&Geier
ATTORNEYS

Aug. 18, 1931. S. MATSUMOTO 1,819,185
LINK BELT
Filed Aug. 15, 1928  3 Sheets-Sheet 2

INVENTOR
SHIGERU MATSUMOTO
BY
ATTORNEYS

Patented Aug. 18, 1931

1,819,185

UNITED STATES PATENT OFFICE

SHIGERU MATSUMOTO, OF TOKYO, JAPAN

LINK BELT

Application filed August 15, 1928, Serial No. 299,657, and in Japan April 5, 1928.

The present invention is an improvement over the chain belts described in my British Patent No. 235,616, United States Patent No. 1,604,059, and Japanese Patent No. 74,244, and aims to increase the efficiency and durability of link belts consisting of a series of members in which one end of the arms of the members connecting the links is extended and bent and is used for fixing a position of the other arm thereof extending through the aligned terminal openings of adjacent link members, the rocking part of the arms being made triangular or polygonal; or which the two sides situated farthest from the opposite arms are inscribed or wedged in the terminal opening; one side near the said arms contacting with a like polygonal side of the other relative arm is made to act as a rolling surface, mutual rolling motion of the arms is also made as a rolling surface formed by the said polygonal side as a rolling surface; and the bent part of the arms is used for tightening the link-belt transversely of its length. The objects of this invention are first to shorten the rolling motion of the arms against a certain extension and contraction of the belt and thereby to avoid the wastage in the transmission of power; secondly to provide arms with a plane key-way or wedge-like contact with the terminal opening and thereby to make the position of rolling surface secure; to raise and intensify the curvature of such surface; and to reduce the wear of the contact part and consequently to increase the durability of the belt; and thirdly to simplify the construction of arms, to facilitate the belt-manufacturing and also the construction and assembly of the mechanism of link belts.

Figure 10:
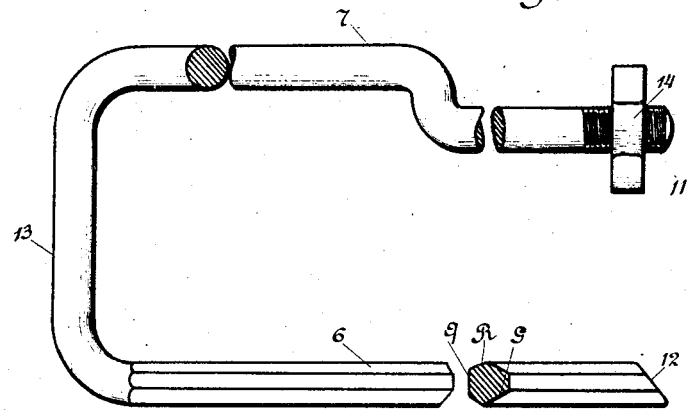
Figure 9:
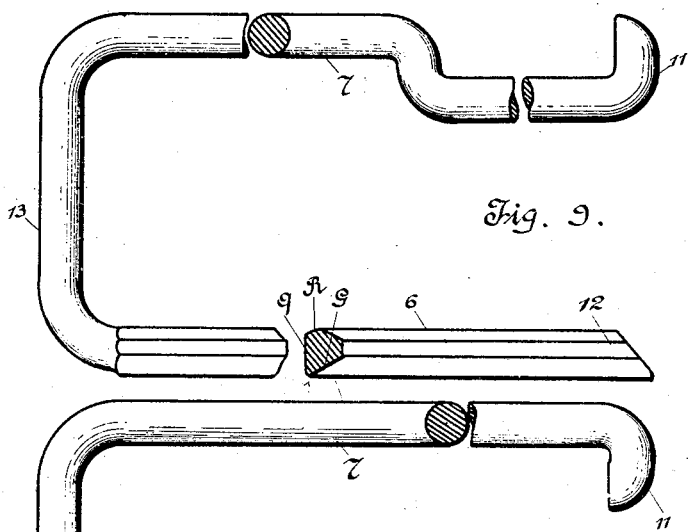
Figure 8:
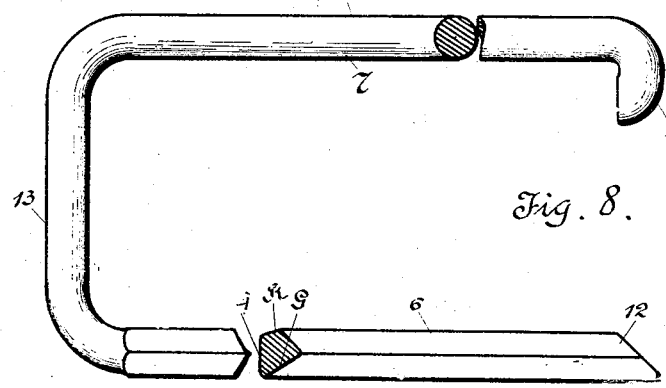

Figures 8 to 10 inclusive illustrate U-shaped connecting members.

Referring to the drawings in detail, and wherein similar reference characters designate corresponding parts throughout the several views, each link of the chain is composed of a plurality of uniformly spaced intermediate link members 10, the number of which may be varied according to the width of the belt it is desired to employ. The intermediate link members 10 which are preferably punched from sheet metal, are elongated in form, and each is provided with a longitudinal slot 18 for receiving the threaded, or inwardly or outwardly bent arms 7 of the connecting members 13 to be hereinafter more fully described (see Figures 8 to 10). One edge of each intermediate link member 10 is provided with lateral projections or gripping fingers 16 and 16, the inner faces of which are disposed in outwardly converging relation thereto to engage and prevent displacement of a friction pad 17, the side edges of which are beveled according to the position of the projections 16 and 16 whereby lateral displacement of the pad from the link is prevented. These link members 10 are also provided with terminal openings 15 and 15 which are adapted to receive two of the pivot arms 6 of adjacent connecting members 13.

The side link members 20, which are also provided with two terminal openings 15 and with slots 18, are so asssembled with respect to the intermediate link members 10 that they will be positioned approximately opposite the side faces of the pad 17 and thereby be in a position to prevent a longitudinal displacement of the pad from the link.

Each of the U-shaped connecting members 13 has one arm 6 formed with longitudinally extending polygonal surfaces G, Q and R engaging with a similar polygonal surface of the other connecting member in the openings provided in the link members. Each of the members 13 also has the opposite arm 7, which is either provided with screw threads at its free end or has an end 11 bent inwardly or outwardly at a right angle, and formed with an offset disposed substantially midway of the length of the link.

Subsequent to the assembling of the required number of link members 10 and side members 20, the adjacent ends of groups of the spaced intermediate link members and side link members are interfitted in the usual manner so that the slots 18 and terminal openings of the link members are disposed in substantial alignment. The connecting members 13 may then be inserted, with the straight or pivot arms 6 extending in contacting relation through the terminally disposed openings of the link members, and with the threaded or bent arms of the connecting members extending through the longitudinal slots of the link members in overlying relation with the threaded or bent end portions thereof lying outwardly of the side link members 20. The central portions 19 of the side link members 20 are adapted to be pressed by retaining nuts 14 or the bent ends 11 of the arms 7 of the connecting members 13.

No matter how many polygonal surfaces they may have, the polygonal straight arms 6 and 6 are tightly inserted in the terminal openings 15 of the link members, by engaging their two definite polygonal surfaces G and Q, farthest from the arms 7, with straight edges 8 and 9 of said openings 15 provided in the link members 10 and 20 and thereby the position of the arms 6 is fixed in relative engagement with the link members 10 and 20; and the wear by friction due to the slide motion of the said arms is protected while it is made convenient to give the rolling surfaces R and $R_1$, a maximum curvature, notwithstanding the size of the arms 6, by rendering the nearest polygonal portions to the arms 7 the rolling surfaces R and $R_1$.

In threading the arms 7 into the slots 18, the arms 7 are inserted through the aligned slots of the adjacent ends of groups of spaced link members 10 and 20, by utilizing the inward spring action of the arms 7 and the form of round end portion 11 of the same. Arms 6 are prevented from disengagement by the engagement of each of the end portions 11 of the arms 7, in the inside of the other connecting members 13, with the central portion 19 of the side link members 20.

Figure 1:
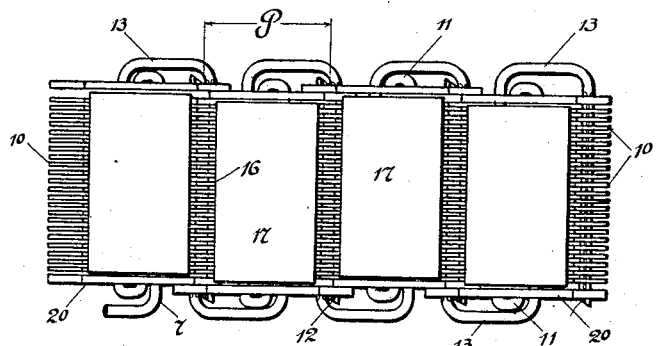
Figure 1 is a fragmentary plan view of the inner or working face of the belt.
Figure 2:
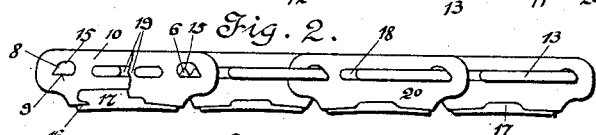
Figure 2 is an end elevation of a portion of the belt.
Figure 3:
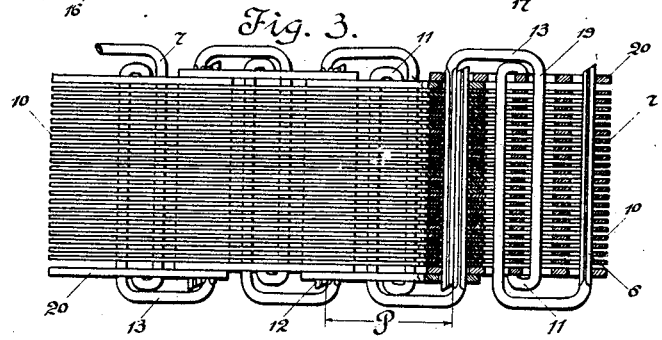
Figure 3 is a fragmentary plan view of the outer face of the belt, and showing certain parts broken away.
Figure 4:
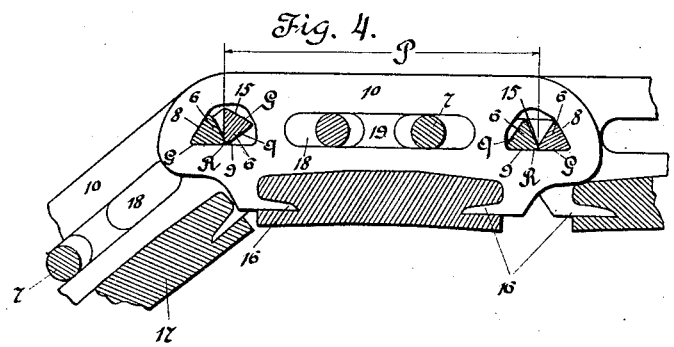
Figure 4 is a fragmentary sectional side view of the belt, and showing relative positions of rocker-pins or arms of connecting members corresponding to positions of links.
Figure 6:
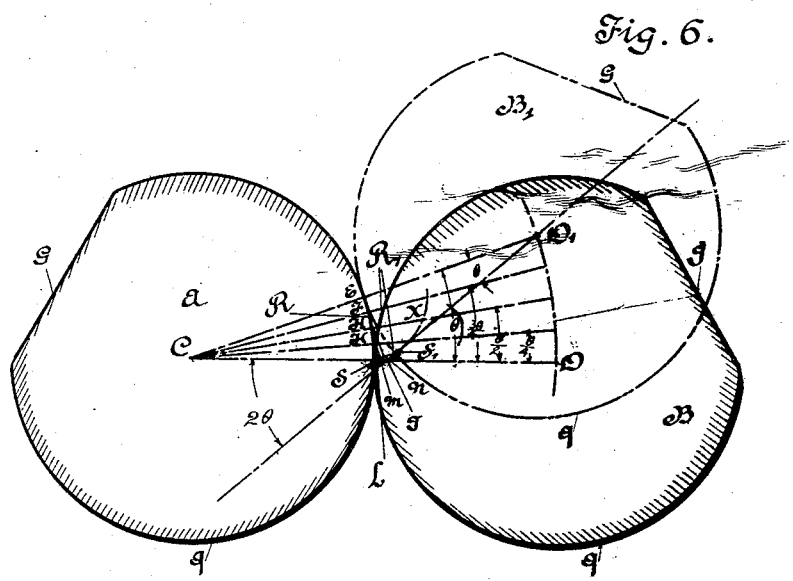
Figure 6 shows in section a successive rolling passage of two round rocker-pins which turn about their circumferences as a rolling surface.

According to the present invention the rolling motion of the arms 6 is limited relatively to a definite motion of the link members 10, by definitely giving the rolling surface R and $R_1$ a large curvature by means of the special form of the said arms 6, the effect thereof being to shorten the rolling motion of the arms 6 and save the waste of energy used for the rolling motion by round arms A and B shown in Figure 6, which is illustrated in the said patents. The reason for this result, as will be described more fully hereinbelow, is to be attributed to the nature of the rolling motion of the arms 6. Before I explain this rolling motion, it will be desirable to study first the rolling motion of the round arms A and B in Figure 6 in which the curvature of the rolling surfaces R and $R_1$ is small as the roundness of the arm is extremely small.

In Figure 6, a pair of round arms A and B in juxtaposition in the terminal opening 15 of a chain-belt are in line-contact at a point S on a straight line joining rolling centres C and D. If plane surfaces G of the arms which obliquely meet the straight line CD and a point Q on the surface of each of the arms nearly opposite to the surfaces G are respectively in surface-contact with a straight edge 8 and in line-contact with a straight edge 9 of the terminal opening 15, each of said edges obliquely meeting at the end portions of the link members 10 and 20, the belt is straight and tight. When the belt is in flexure on the rim of a pulley and the link members 10 and 20 made to turn inwardly at any particular portion by a required angle $2\theta$, the arm B will occupy the position of arm $B_1$, by rolling outwardly for an angle $\theta$ along the rolling surface R of the arm A, as rolling surface with surface $R_1$. The point S will then move to the point E, and the rolling centre D to a point $D_1$. The point S of the same arm B which was in line-contact will be raised up to a point $S_1$. If two central lines CS and $D_1S_1$ of the belt tightening face which pass through the rolling centres C and $D_1$ meet at a point T, the pitch P of the link members 10 and 20 supported by the arm A is shortened by a length ST and that supported by the arm B is shortened by a length $TS_1$. An amount of energy is expended in the meantime which is equal to the amount of work required to raise the belt by the distance $SS_1$ between the points S and $S_1$ in the line-contact towards and against the belt tightening force, multiplied by sine of the rolling angle $\theta$, viz: $SS_1 \sin \theta$, hereinafter termed $h$ centimeters.

The work as such corresponds either to the amount of work necessary to raise a weight $mg$ due to the tightening force ($m$ and $g$ are respectively represented by its mass and the acceleration of a falling body) to $h$ centimeters or potential energy $mgh$. If a maximum speed $v$ is obtained before the weight $mg$ in dynes falls and rests, its kinetic energy $\frac{1}{2} mv^2$ will be equal to the potential energy. If the said belt is in flexure on the rim of a pulley and is extended out of the pulley due to its tightening force at the other side of the pulley, and the link members 10 and 20 turn through an angle $2\theta$ in opposite direction to the former while the arm B makes reverse rolling motion by an angle $\theta$ on the arm A, the arm $B_1$ will have fallen down by $h$ centimeters in a direction of such force as the arm $B_1$ bears a weight corresponding to the tightening force of the belt. If a maximum speed $d$ centimeters is obtained for the time during which the point $S_1$ on the arm $B_1$ returned to its original point S in the line-contact and the rolling motion ceases, an amount of work obtainable in the time will be $\frac{1}{2} mg^2$ in ergs. However, the speed $d$ is extremely small compared with the speed of falling bodies $v$, for example, let the link members of the chain belt running at a high speed, 15 meters per second, describe a rolling angle $\theta = 20°$ out of a pulley whose diameter is 15 centimeters, let the pitch of the link members be 2.5 centimeters, and the diameter of the round arms 0.15 centimeters, then the speed attained in the direction of the tightening force of the belt due to the rolling action of the arms is less than 2.5 centimeters per second and corresponds to about one fortieth of the speed $v$ of a falling body.

Figure 7:
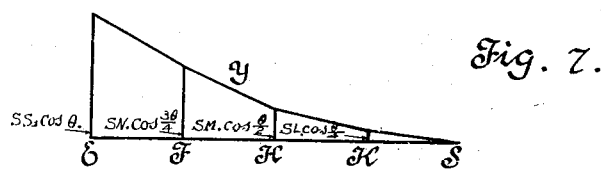
Figure 7 shows in diagram a view of the round rocker-pins shown in Figure 6 which turn about each other.

A quantity of work, obtainable at a time of the stretch of the belt, $\frac{1}{2} mg^2$ kinetic energy, in ergs becomes extremely less compared with that of work $\frac{1}{2} mv^2$ kinetic energy, spent at a time of its flexure. Consequently it follows that the amount of power wasted by the flexure of the belt of this type is, generally speaking, the amount of the work lost by contraction of the pitch of a link so that the potential energy $mgh$ may, for practical purposes, be regarded as kinetic energy or $\frac{1}{2} mg^2$ in ergs even when the arm may act contrariwise to the above owing to the relative position of the arm to the shape of the terminal opening into which it is fitted; that is to say, either when the pitch of a link is relaxed or extended due to the belt taking a bending or curved position, or when the pitch is contracted due to the belt's relaxed or extended position. Let K, H and F be intersection points of the rolling surface R of the arm A which respectively meet with straight lines CK, CH and CF (which makes an angle $\frac{\theta}{4}$, $\frac{\theta}{2}$ and $\frac{3\theta}{4}$ by dividing the rolling angle $\theta$ into four equal parts, with the rolling surface R of the arm A and let L, M and N be points at which the rolling surface $R_1$ of the arm $B_1$ meet a curved line X described by a point $S_1$ of the arm $B_1$ which was, at first, at a point S in line-contact with the arm A, when the arm B occupies a position of arm $B_1$ in rolling motion by the rolling surface $R_1$ of the arm B which was at the points K, H and F in line-contact. We may then draw a curved line Y which has as abscissæ (SK), (SH), (SF) and (SE), lengths on the rolling surface R corresponding to rolling angles $\left(\frac{\theta}{4}\right)$, $\left(\frac{\theta}{2}\right)$, $\left(\frac{3\theta}{4}\right)$, and $(\theta)$ as in Figure 7, and in ordinate $\left(SL \sin\frac{\theta}{4}\right)$, $\left(SM \sin\frac{\theta}{2}\right)$, $\left(SN \sin\frac{3\theta}{4}\right)$, and $(SS_1 \sin \theta)$, lengths raised in direction of the belt resisting its tightening force by the rolling motion of respective rolling angles $\left(\frac{\theta}{4}\right)$, $\left(\frac{\theta}{2}\right)$, $\left(\frac{3\theta}{4}\right)$, and $(\theta)$.

The curved line Y expresses that when the round arms A and B, shown as in Figure 6, perform rolling motion on the rolling surfaces R, $R_1$ by a length shown as abscissæ with respect to every point on the curved line, the belt which has these arms as axes, is tightened or contracted in the direction of, and resists the tightening force by a length shown as ordinates corresponding to said abscissæ, and also expresses a ratio of waste work for the extension and the contraction of the belt corresponding to the length of the ordinate of a point on the curved line. This suggests that to make said ratio small, it is necessary to make the curvature of the rolling surfaces R and $R_1$ large, and to make said curvature a maximum, the rolling surfaces R and $R_1$ are provided, in accordance with the present invention on a vertex of an angle.

Figure 5:
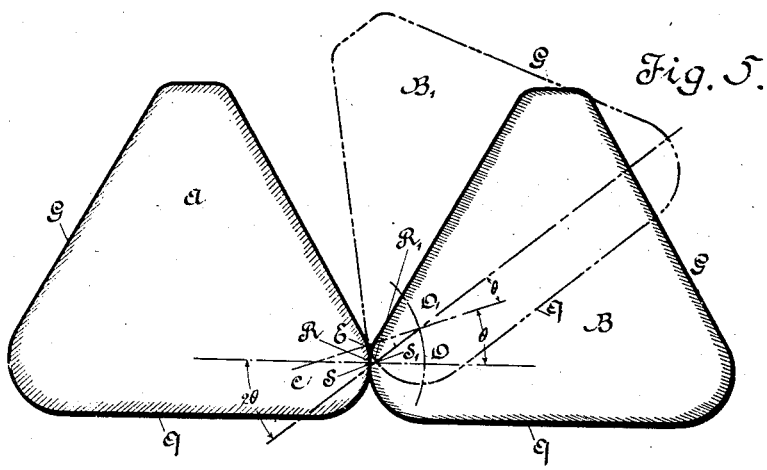
Figure 5 shows in section a view of two polygonal rocker-pins which turn about their polygonal sides as a rolling surface.

The present invention, therefore, involves the use of highly strengthened polygonal arms A and B instead of the round arms A and B shown in Figure 6. Flat sides G and Q of the polygonal arm make fixed and constant contact with the sides of the terminal opening 15. In co-operation with the unmovable fixed and constant contact, the curvatures of the rolling surfaces R and $R_1$ on the polygonal sides are increased to a required value and consequently effect a considerable reduction in the amount of waste work due to the rolling motion of the arms A and B. A triangular arm A which has a rolling center D and a triangular arm B having a rolling center C, as in Figure 5, are in line-contact with the polygonal sides to each other, giving $x$-times curvatures of that of the rolling surfaces R and $R_1$ of the round arms A and B at a point S on a straight line CD joining said rolling centers C and D. The straight tightened chain-belt, keeping the bottom sides Q and Q in a straight line, is in flexure on pulleys. If the link members 10 and 20 rotate for each pitch through an angle $2\theta$, the arm B rotates with the rotating surface $R_1$ through the rotating angle $\theta$ on the rotating surface R of the arm A; said arm B occupies the position of $B_1$; the point S in line-contact that of E; the rolling center D that of $D_1$. Let the point S on the arm $B_1$ at which the arm B was in line-contact with the arm A be denoted by $S_1$, the quantity of waste work done during a time for which the arm B made rotation along the rolling surface R by a length SE, may be expressed by a product of the tightening force of the belt and a length $SS \sin \theta$ which is resisted against and tightened towards said force, and the value of the same entirely relates to the curvature of the rolling surface R and $R_1$. If the tightening force of the belt, rolling angle and the quality of the rolling surface are made equivalent to that of the round arms A and B; the curvature being $x$-times that of the round arms A and B, the radius of curvature (CS), (SD), and ($S_1D$) become one $x$th; and the distance between line-contacts also becomes one $x$th, and hence the quantity of work lost by the rolling motion of the triangular arms A and B will be one $x$th of the quantity of work expended by the rolling motion of the round arms A and B under the foregoing conditions. The shape of the polygonal arm 6 has not only increased its strength, but the value of $x$ is made greater than that of other arm, and the quantity of work lost by the rolling motion of the arm may, therefore, be made a minimum. For the construction of the simplified bent arms 7 the manufacturing cost is made low, and of course facilitated for engagement and disengagement of the belt; the wear of the arms 6 is prevented by smooth key-way contact of the terminal opening 15 and the arms 6. The position of the rolling surfaces R and $R_1$ being kept constant, their curvatures are adapted to be made greater; and even though the arm 6 break in the middle in the terminal opening 15 by accident, the fragment of the same is made not to rotate to an inconvenient position for driving of the belt.

In order not to easily twist out the friction pad 17, though the friction pad 17, which is soft and has a high frictional coefficient, is engaged between the gripping fingers of each of the intermediate links of the chain-belt and makes a large angle of contact, the gripping fingers 16 of the link members 10 are made sharp; incisions are provided for the pads wherein the gripping fingers are inserted; said pads 17 are engaged with said fingers, by bending in said pad, in order, from one of said fingers. For deadening thrust which may be subjected at the side of the belt and to reduce the wear, the connecting members 13 may be covered with a piece of fabric; to eliminate the danger of detachment of a fragment of the arm 6 by the breakage of axis 5, the arms 6 are made big, or claviform at one end 12, as shown in Figures 1 to 4 inclusive.

Retaining nuts 14 may be used and screwed upon the end 11 of the opposite arm 7 instead of bending the end 11. The retaining nuts 14 having recesses provided in the peripheral faces thereof, are adapted to be threaded upon the ends of the arms 7 and turned down into engagement with the side plates 20 for preventing displacement of the pads 17. Owing to the inward spring action of the arms 7, the nuts 14 will be held in engagement with the arm 7 of the adjacent connecting member in a manner so as to prevent radial movement of the nuts and its subsequent displacement and loss. If it is necessary to reduce a quantity of work expended for the flexure of the belt and to increase a quantity of work required for the extension of the belt, the contact of a part 8 upon which the arms 6 receive force from the link members 10 and 20, is narrowed, or is given an easy gradient; the center line (CS), ($D_1S_1$) may be approached to the surface of the belt from the rolling center C, D and $D_1$ of the arms 6.

Various changes in the shape, size, and arrangement of parts may be made in the form of invention herein shown and described, without departing from the spirit of the invention or the scope of the following claim.

I claim:

A chain belt which is composed of a plurality of interfitting links, each link being provided with terminally disposed openings and intermediate openings, U-shaped connecting members alternately disposed at opposite sides of the belt with one of the arms thereof extending through the aligned terminal openings of adjacent link members in rolling engagement with one arm of an adjacent connecting member, and having its opposite arm extending through one of the intermediate openings, the rocking part of the arms being of triangular shape to provide triangular pivot arms whose bases coincide in a straight line during the straight run of the chain and which turn on each other on an arc of large curvature at the point of rolling; said arms being inscribed and wedged in the terminal opening; the edge of one of said arms being in contact with a like edge of an adjacent arm and constituting a rolling contact; and the ends of the other arms being bent for tightening the chain-belt transversely of its length.

In testimony whereof I have affixed my signature.

SHIGERU MATSUMOTO.